April 29, 1952   S. J. GARTNER   2,595,071
PIN FEEDER
Filed Oct. 16, 1947   4 Sheets-Sheet 1
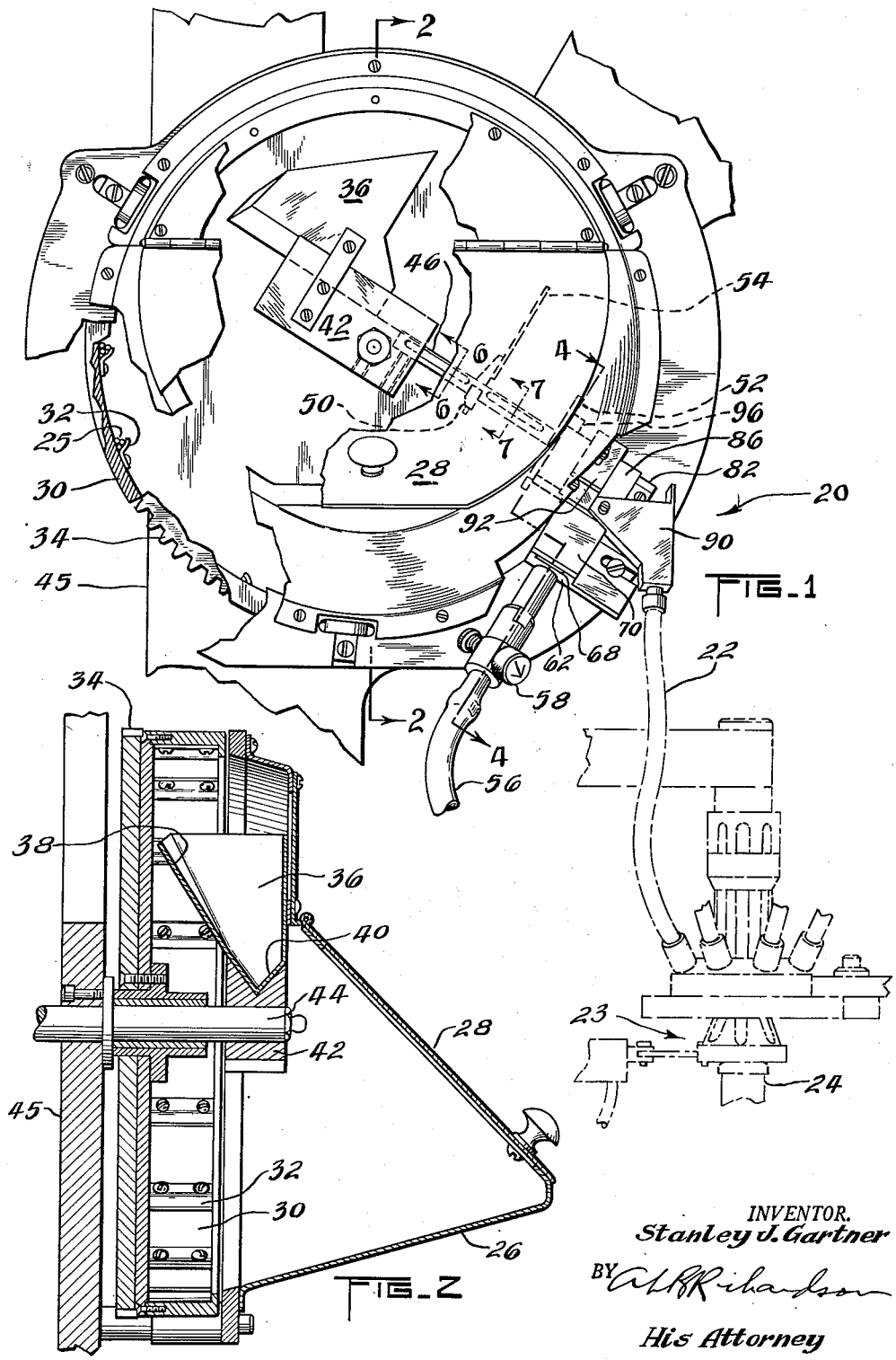
INVENTOR.
Stanley J. Gartner
BY A.R.Richardson
His Attorney April 29, 1952 S. J. GARTNER 2,595,071
PIN FEEDER
Filed Oct. 16, 1947 4 Sheets-Sheet 2
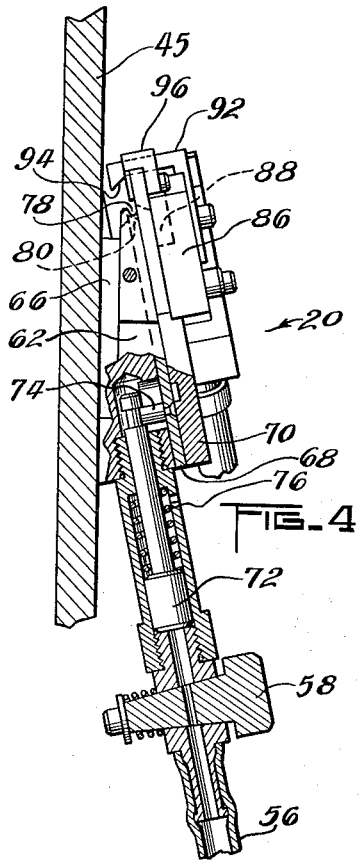
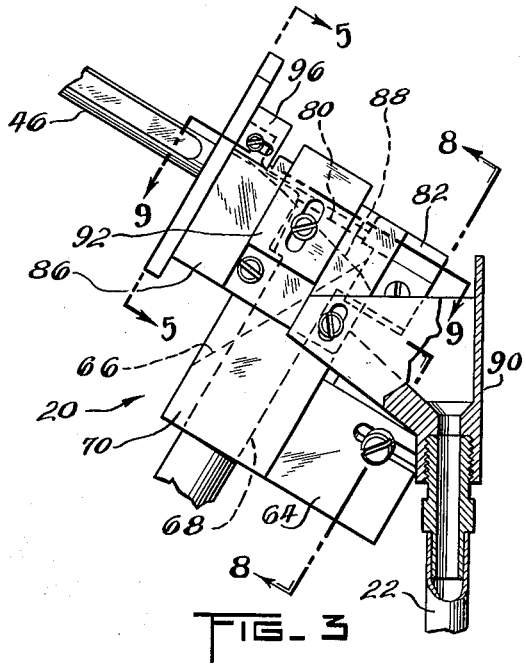
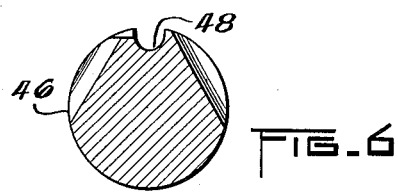
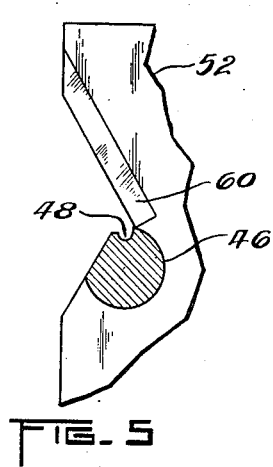
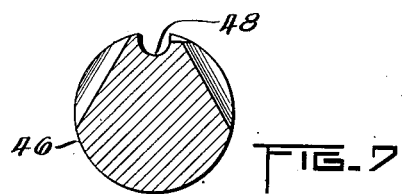
INVENTOR.
Stanley J. Gartner
BY
His Attorney April 29, 1952     S. J. GARTNER     2,595,071
PIN FEEDER Filed Oct. 16, 1947     4 Sheets-Sheet 3

INVENTOR.
Stanley J. Gartner
BY
His Attorney

April 29, 1952  S. J. GARTNER  2,595,071
PIN FEEDER
Filed Oct. 16, 1947  4 Sheets-Sheet 4

INVENTOR
STANLEY J. GARTNER
ATTORNEY

Patented Apr. 29, 1952

2,595,071

UNITED STATES PATENT OFFICE 2,595,071

PIN FEEDER

Stanley J. Gartner, Emporium, Pa., assignor to Sylvania Electric Products, Inc., a corporation of Massachusetts Application October 16, 1947, Serial No. 780,213

6 Claims. (Cl. 10—162)

This invention relates to feeding mechanisms.

In the manufacture of radio tubes and similar devices there has been a need for an automatic feeder for short rods of uniform dimensions. These rods or pins are to be delivered one at a time to be molded as inserts in forming the stem or header of a radio tube. The pins are arranged by known means in a single-file stream along a supply chute or guide.

The object of the present invention is to provide mechanisms to feed short rods or pins individually from a single-file stream in a supply chute to a delivery chute leading to their utilization point, in the nature of but more reliable than a mere escapement. While the pin feeder provided by my invention was prompted by the need in stem-forming machines, the feeder obviously is useful wherever uniform objects are to be separated individually from a single-file supply stream.

The pin feeder according to the illustrative embodiment of my invention includes an impeller operating laterally of the single-file supply stream in an inclined chute. Means is additionally provided for inhibiting lateral displacement of the article next following that which is being delivered, even though the first might tend to draw the next with it because of end-to-end frictional contact. Further features of the invention and further objects will be apparent from the following detailed disclosure of a presently preferred but illustrative embodiment thereof. In the drawings which show this preferred embodiment:

Fig. 1 is an elevation of the novel pin feeder showing its orientation in relation to a stem-molding machine.

Fig. 2 is a lateral sectional view along the line 2—2 in Fig. 1.

Fig. 3 is a lateral view of the pin feeder shown partly in section.

Fig. 4 is an end view of the pin feeder, in broken section in the direction 4—4 in Fig. 1.

Fig. 5 is a fragmentary sectional view along the line 5—5 in Fig. 3.

Figs. 6 and 7 are enlarged sectional views along the lines 6—6 and 7—7 in Fig. 1.

Figure 8:
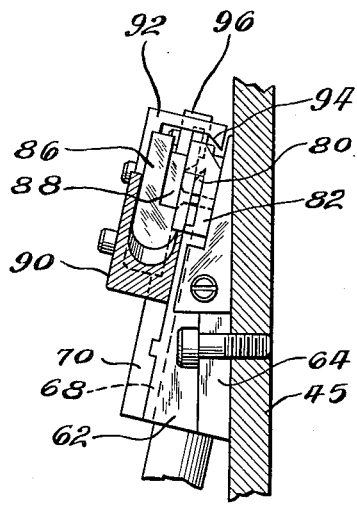

Fig. 8 is a sectional view along the line 8—8 of Fig. 3.

Figure 9:
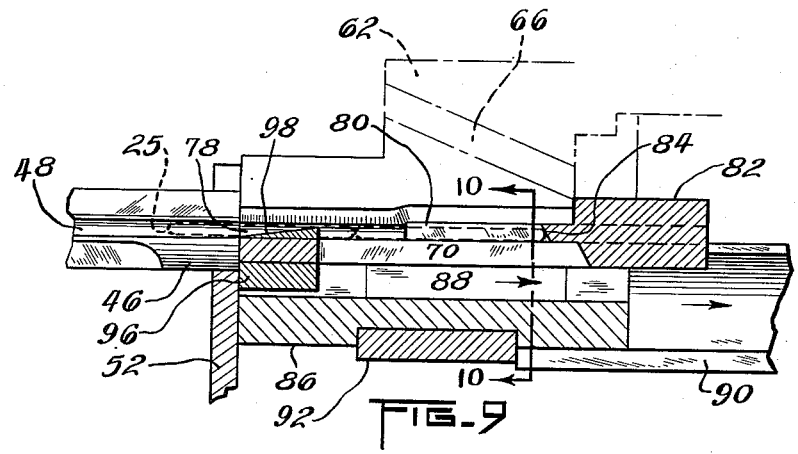

Fig. 9 is a simplified sectional view along the line 9—9 in Fig. 3.

Figure 10:
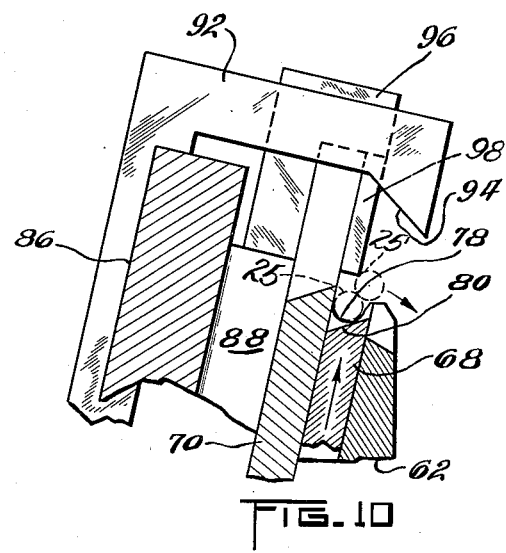

Fig. 10 is a sectional view along the line 10—10 of Fig. 9.

Figure 11:
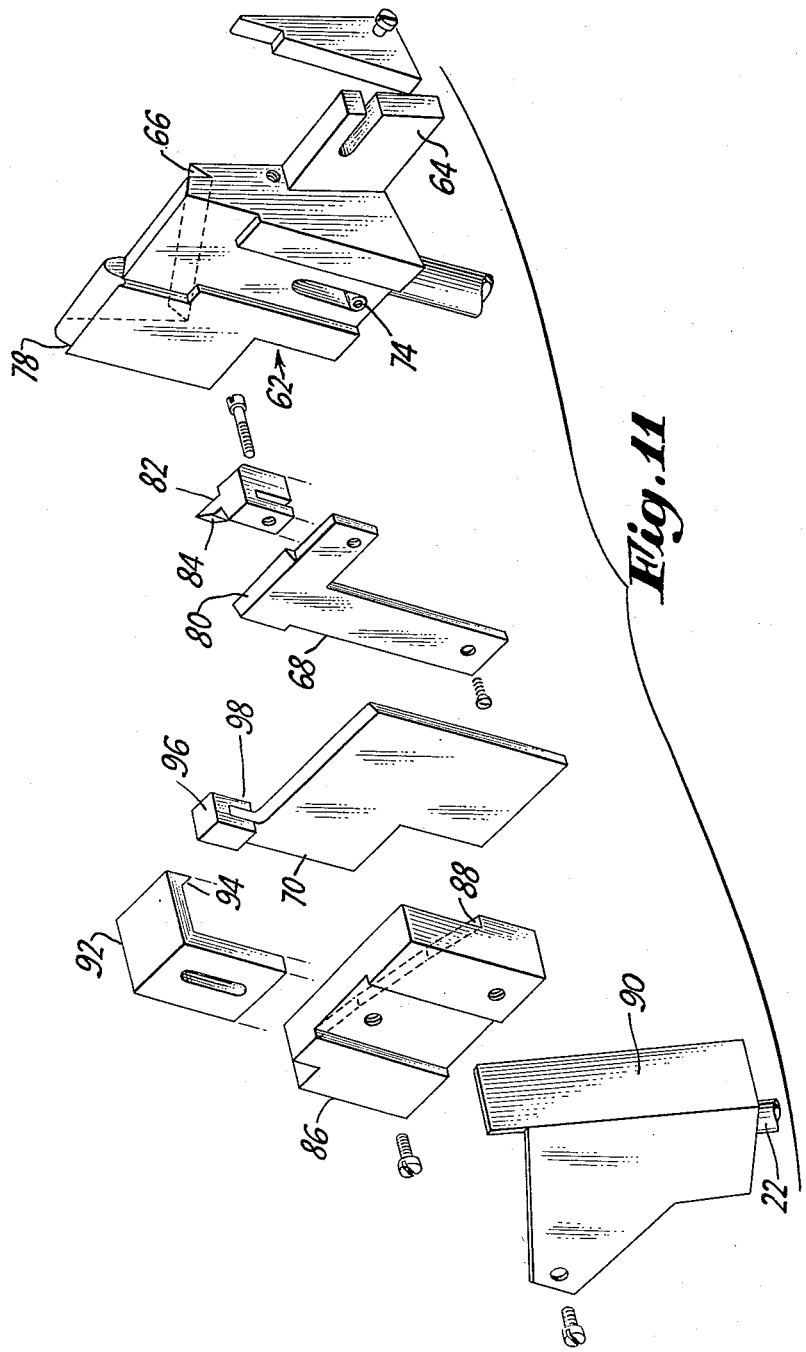

Fig. 11 is an exploded perspective view of parts shown assembled in Figs. 3, 4, 8, 9, and 10.

Referring now to Figs. 1 and 2 the pin feeder generally indicated by the arrow 20 is arranged to drop pins (small rods with rounded ends in this instance) one at a time down flexible tubular guide 22 for eventual deposit into a cavity in mold 24. As many pin feeders and flexible guides are provided as there are pin cavities in the mold. Guides 22 do not always retard the pins equally and for this reason a gate 23 is provided for momentarily arresting the pins as they emerge from guides 22, so that they will concurrently drop into mold 24 when the gate is opened. The mold is usually carried by a turret which is intermittently indexed past this pin-loading station. It is of great importance that the pin feeder operate with the highest degree of reliability. The failure of one pin feeder to deliver one pin among as many as eight or more to be molded in the product represents significant waste in machine time and defective production. Moreover the entire machine would have to be shut down in the event that a single pin feeder should become jammed. The pin feeder of the present invention has been found to be highly satisfactory in these respects.

The pins 25 to be fed are deposited in hopper 26 through door 28 so as to spill into the bottom of drum 30. The pins are carried individually or in small groups from the hopper to the top of the drum by multiple vanes 32, the drum being rotated at a constant moderate rate by gear 34 and suitable drive means not shown. Vanes 32 are shaped so that the pins drop when they reach the top of the drum. The pins are caught by a form of funnel 36 having one wall 38 extending below the region where the pins are released. The walls of funnel 36 are disposed at a small angle to the vertical so as to minimize bouncing of the pins, and they are so shaped that the pins are oriented with their lengths along trough 40 forming the bottom of the funnel. Funnel 36 is carried by block 42 on stationary shaft 44 which also forms the support for the bearing of drum 30. Shaft 44 is carried by stationary vertical supporting plate 45 which also sustains hopper 26.

Inclined rod 46 is provided between the exit of channel 40 and pin feeder 20 for guiding the pins in a single-file stream. The upper surface of rod 46 is grooved at 48 and relieved (Figs. 6 and 7) so that, in the event of a second pin overlying a pin in the groove, the top pin will drop off rod 46 from one side or the other. This is promoted by the roundness of the pins themselves which causes the undesired pins to lie to one side or the other of the pin in the groove. A scraper 50 is supported midway along rod 46 for further promoting this normal tendency of the excess pins to drop off rod 46 and a second scraper 52 is provided for further assuring removal of the excess pins. The pins removed drop into hopper 26. Scraper 50 carries a deflector plate 54 for protecting the lower portion of rod 46 against random pins dropping from the drum and not caught by funnel 36.

The foregoing arrangement of hopper, drum, funnel and grooved rod 46 furnishes a continuous stream of pins in endwise abutment on which the novel pin feeder of the present invention is to operate, supplying them individually to tubes 22. Pin feeder 20 is pneumatically operated through air line 56, bursts of pressure being supplied by means not shown in timed relation with the operation of gate 23. In the event that the number of pins in the molded product is to be reduced the operation of any given pin feeder 20 can be suppressed simply by shutting valve 58 in the air supply of the appropriate pin feeder. The continued operation of the drum and the other feeders need not be interrupted.

Referring now to Figs. 3 to 10 it will be seen that pins travelling down rod 46 will be received in a constant single file. The action of scraper 52 in limiting the stream to a single file of pins is illustrated in Fig. 5 where surface 60 pushes pins to the left, where those pins might otherwise rest to the right of the desired pin in groove 48; and pins thus moved will be carried by their momentum laterally off rod 46.

Rod 46 abuts the main block 62 of the novel pin feeder. Block 62 is extended at portion 64 which is slotted so that it may be secured to vertical plate 45 in the proper position of adjustment to confine the ends of rod 46 between blocks 42 and 62. The face of block 62 adjacent vertical plate 45 is relieved to provide a return channel 66 for extra pins that may, despite precautions, overlie the single-file pins within the pin feeder. The entire pin feeder is constructed at an angle to vertical plate 45 as is apparent from Figs. 4, 8 and 10 and this promotes the rejection of second-layer pins. A slide 68 is confined against the outside face of block 62 by plate 70 and is reciprocable at a small angle to vertical plate 45 by piston 72 (see Fig. 4) through connecting stud 74. The slide and the piston are normally maintained in their lower position by compression coil-spring 76.

Block 62 is provided with a groove 78 as an extension of groove 48 and constituting part of the supply chute; and shelf 80 of slide 68 further extends the inclined gravity chute. Shelf 80 slopes laterally away from plate 45 and toward confining plate 70. It is thus apparent that as slide 68 is raised the pin overlying shelf 80 is urged against plate 70.

The longitudinal extent to which pins of a given size will overlie shelf 80 is dependent on the position of adjustment of stop 82 clamped to slide 68. The surface 84 on stop 82 that is contacted by the ends of the pins is sloped in the direction to urge the pins against confining plate 70.

Stationary block 86 is fixed to the assembly of main block 62 and confining plate 70 outward of vertical plate 45, and is relieved to provide a delivery chute 88 that is joined to tube 22 by transition piece 90. A stationary arm 92 overhangs slide 68 and is provided with a deflecting surface 94 so sloped as to direct the upwardly impelled pins laterally toward block 86, to be received by chute 88. For thus laterally impelling pins 25 in the normal operation of the pin feeder, abrupt bursts of pressure are supplied to piston 72 by means not shown. The air valve of copending application Serial No. 698,256 filed September 20, 1946 by Henry W. Roeber, now abandoned, is well suited to this purpose. This arrangement insures uniformity of feeding action irrespective of slight variations in surface characteristics of the feeder and of the pins due to the presence of oil films, dust or the like. The action of slide 68 and deflecting surface 94 is vigorous and sends the pins individually clattering down chute 88 in a manner that guards against sticking and jamming.

The pins are pressed in endwise abutment as they overlie the composite channel 48, 78, 80. Stop 82 is so adjusted that the pin overlying shelf 80 extends to some small degree over groove 78. Due to endwise friction of the pins over groove 78 and shelf 80 there is a tendency of each pin being lifted by slide 68 to raise the end of the next-following pin out of groove 78. This is inhibited by an overhanging piece 96 without entirely preventing lateral motion of the next-to-last pin. Sufficient clearance is allowed so that jamming of the pins does not occur because of an unduly constricted passage. Piece 96 has a lateral face 98 slanting in relation to the supply chute (see Fig. 9) which further extends the effect of surface 60 in deflecting any pins that might overlie the single-file pins, and to return them via chute 66 to hopper 26. Pin 25' that is to be deflected by slanting surface 98 is shown in Fig. 10 overlying pin 25 that rests properly in groove 78.

The foregoing description of a specific embodiment of my invention has been found highly effective in achieving the intended purposes. It should be remembered that it is merely intended as a specific illustrative form that is susceptible of considerable modification without departing from the spirit of the invention.

What I claim is:

1. A pin feeder comprising an inclined supply chute for supplying a continuous stream of pins in endwise abutment, an abruptly operative slide reciprocable at right angles to said chute and forming the under side of the lower end thereof and effective in operation to throw pins laterally and individually upward from their path along said supply chute, a second chute positioned laterally of said first chute, and a fixed deflector positioned above said slide and in the path of said thrown pins to direct said pins laterally toward said second chute.

2. In a feeding mechanism, a device for separating a continuous stream of uniform articles into individual articles delivered at desired times, comprising supply and delivery chutes providing substantially parallel gravity paths, an impeller forming the under side of the lower extremity of the supply chute and operating along a line perpendicular to the lengths of said chute for lifting articles individually at right angles to said supply chute, a stationary deflector positioned above and in the path of said impelled articles for directing them into said delivery chute, and a member having a surface slanting in relation to the axis of the supply chute alongside the position occupied by the next-to-last pin in the supply chute for restraining that pin from accompanying the laterally impelled lowermost pin, said chute being open opposite said slanting surface of said member to receive pins that may overlie the next-to-last pin.

3. A feeder for small rods of uniform length comprising an inclined supply chute, a delivery chute at one side thereof and a return chute at the other side thereof, an impeller arranged to engage the side of the lowermost rod in the supply chute and forcibly impel it at right angles to its pervious path, the direction of movement of the impeller in the impelling direction being inclined so as to have a component of motion toward said return chute, and a deflector arranged to engage and redirect the impelled rods toward said delivery chute.

4. A pin feeder comprising an inclined supply chute adapted to carry a number of pins in an end to end relationship along the length of said chute, an impeller member forming the bottom side of the lower end of said chute and having a stop thereon closing the lower end of the chute, the length of said impeller being less than the length of a single pin, means for reciprocating said impeller along a line substantially vertical and normal to the length of said chute, a deflector above said impeller and inclined so as to direct a pin carried by said impeller laterally of the path of said impeller and a delivery chute lying alongside said impeller and adapted to receive pins directed to it by said deflector.

5. A pin feeder comprising an inclined supply chute adapted to carry a number of pins in an end to end relationship along the length of said chute, an impeller member forming the bottom side of the lower end of said chute and having a stop thereon closing the lower end of the chute, the length of said impeller being less than the length of a single pin, means for reciprocating said impeller along a line substantially vertical and normal to the length of said chute, a deflector above said impeller and inclined so as to direct a pin carried by said impeller laterally of the path of said impeller and a delivery chute lying alongside said impeller and adapted to receive pins directed to it by said deflector, and a fixed member overhanging the next pin adjacent said impeller to maintain it on said supply chute as said impeller operates.

6. A pin feeder comprising an inclined supply chute for supplying a continuous stream of pins in endwise abutment, a slide reciprocable at right angles to said chute and having an upper portion forming the under side of the lower end thereof for laterally impelling pins individually upward from their path along said supply chute, a second chute positioned laterally of said first chute, and a fixed deflector positioned opposite said slide and in the path of the impelled pins and having a pin-engaging surface slanting relative to the line of reciprocation of said slide, said slanting surface being parallel to the lowermost pin in position when supported by said slide to direct said pins laterally toward said second chute.

STANLEY J. GARTNER.

REFERENCES CITED

The following references are of record in the file of this patent:

UNITED STATES PATENTS

| Number | Name | Date |
| --- | --- | --- |
| 607,940 | Mayo | July 26, 1898 |
| 715,525 | Tyberg | Dec. 9, 1902 |
| 1,199,887 | Glass | Oct. 3, 1916 |
| 1,558,451 | Balcom | Oct. 27, 1925 |
| 1,863,314 | Phelps | June 14, 1932 |
| 2,002,147 | Jordan | May 21, 1935 |
| 2,398,659 | Mead | Apr. 16, 1946 |